No. 643,055. Patented Feb. 6, 1900.
C. H. HARKINS.
WATER HEATER.
(Application filed July 14, 1899.)
(No Model.)
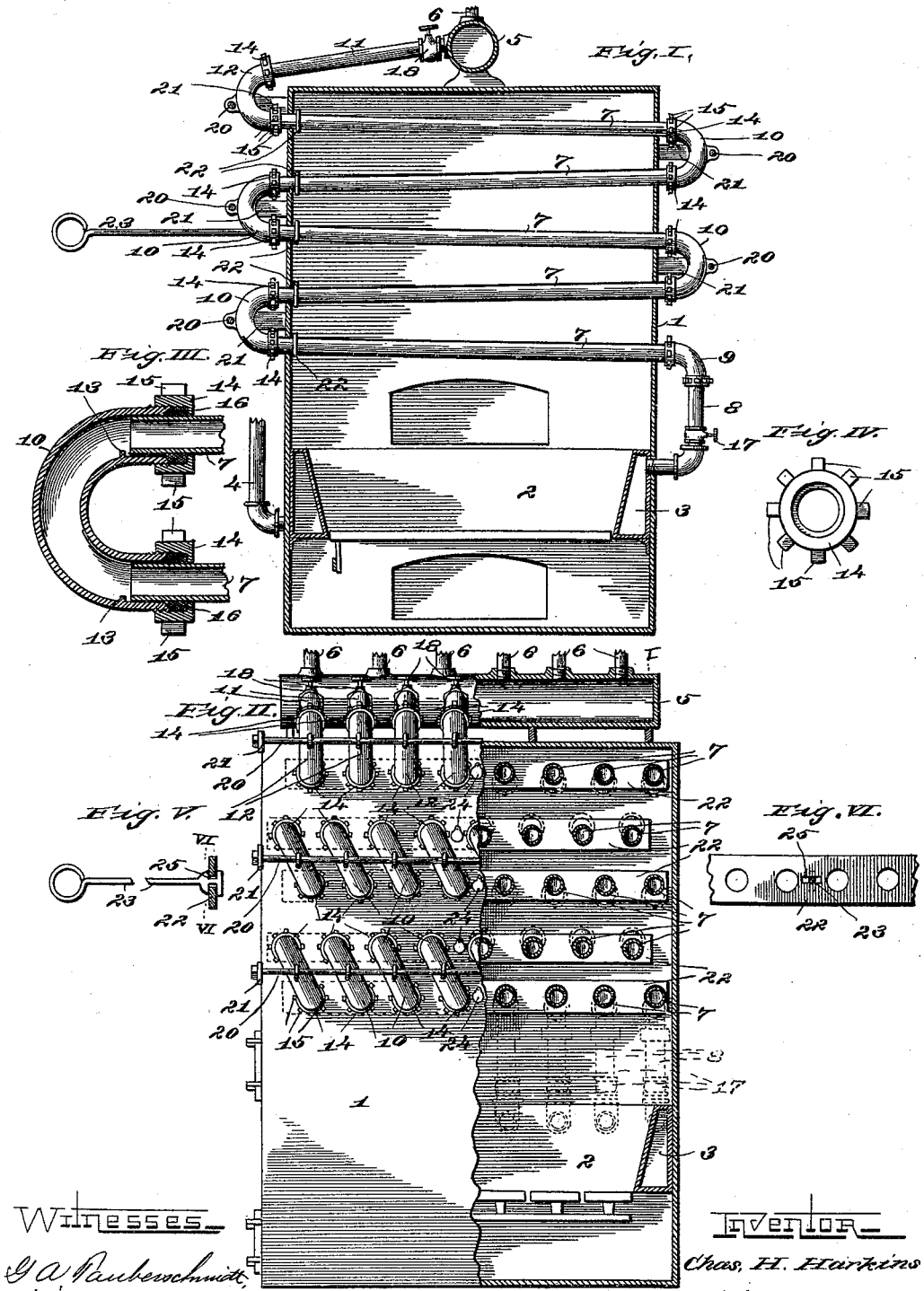

UNITED STATES PATENT OFFICE.

CHARLES H. HARKINS, OF EDWARDSVILLE, ILLINOIS.

WATER-HEATER.

SPECIFICATION forming part of Letters Patent No. 643,055, dated February 6, 1900.

Application filed July 14, 1899. Serial No. 723,851. (No model.)

*To all whom it may concern:*

Be it known that I, CHARLES H. HARKINS, a citizen of the United States, residing at Edwardsville, in the county of Madison and State of Illinois, have invented certain new and useful Improvements in Water-Heaters, of which the following is a full, clear, and exact description, reference being had to the accompanying drawings, forming part of this specification.

The object of my invention is to construct a water-heater which will possess superior water-heating qualities to any now on the market, so far as my observation has gone, which will be inexpensive to construct and durable in use, which can be readily repaired in its different parts, and which can be set up or put together quickly and easily even by a person inexperienced in such matters.

My invention consists in features of novelty hereinafter fully described, and pointed out in the claims.

Figure I is a vertical section through the casing and fire-box of my improved heater, the water-pipes being shown in elevation, the section being taken on line I I, Fig. II. Fig. II is an elevation, part in vertical section. Fig. III is an enlarged detail section taken through one of the elbows and its joints. Fig. IV is an enlarged view of one of the nuts off the elbows. Fig. V is a sectional view of one of the cleaning bars or plates, showing the rod for operating the plates. Fig. VI is a section taken on line VI VI, Fig. V.

Referring to the drawings, 1 represents the casing of a heater having any usual form of fire-box 2, containing a water-chamber 3.

4 represents the supply-pipe.

5 represents a manifold located, preferably, above the heater, as shown in Figs. I and II, and with which the distributing-pipes 6 communicate.

7 represents the heating-pipes, which are arranged within the casing or housing 1 in a substantially horizontal position. There are a number of these pipes crossing the casing, each pipe of the lower row being connected to the water-chamber 3 by means of pipes 8 and elbows 9. The pipes are arranged in vertical series, those of each series being connected by means of elbows 10, the top row of pipes being connected together in pairs to the manifold 5 by means of pipes 11 and elbows 12. The pipes are plain pieces of tubing, the ends of which enter the elbows 10, as illustrated in Fig. III, the elbows being provided with projections 13 to limit the inward movement of the pipes.

To secure a tight joint between the elbows and the pipes, I employ nuts 14, tapped onto the elbows and provided with peripheral projections 15 to receive a wrench or tool by which the nuts can be readily tightened. Surrounding the pipes within the nuts are packing-rings 16, which when the nuts are screwed up form water-tight joints between the elbows and the pipes. The pipes 8 are provided with valves 17 and the pipes 11 are provided with valves 18.

Should any one of the pipes 7 in any one of the vertical series of pipes become clogged or leaky, the valves 17 and 18 of this series of pipes can be closed, and by manipulating the nuts 14 the obstructed or leaky pipe can be taken out (without interfering with the other series) and cleaned or replaced by another, and owing to the manner of connecting the elbows to the pipes which I have illustrated and described the work can be done by any inexperienced person without calling in a plumber or a person especially qualified to make repairs in hot-water heaters.

To avoid danger of the elbows being forced off the pipes by the water-pressure, I employ rods 20, that pass through perforated projections 21 on the casing, these bolts acting to resist any outward movement of the elbows on the pipes.

Inasmuch as the heat of the furnace is more intense immediately above the fire-box than it is higher up, I employ pipes 7 of different thicknesses of material, those of the bottom rows being thicker than those higher up, so that the pipes as a whole will last about the same length of time.

For the purpose of cleaning the exterior of the pipes 7 and keeping them from being covered with soot and ashes I employ plates 22, perforated to receive the pipes, as shown in Fig. VI, a plate being used for each horizontal row of pipes. By moving these plates along the pipes from one side of the casing to the other the soot and ashes are scraped off and the pipes thereby kept clean, so as to get the best results in heating the water. As a means for moving the plates, I have shown a key or rod 23, adapted to be inserted through holes in the casing, (these holes being closed by swinging caps 24,) the key having a notched head adapted to enter slots 25 in the plates and upon being turned a quarter of a revolution will engage the plates, so that by pulling and pushing on the rod the plates can be moved along the pipes.

It will be observed that the horizontal arrangement of the rows of pipes is such that they break joints with each other—that is to say, the pipes of one row are opposite the spaces of the adjacent rows, so as to get the full effect of the heat.

One of the important features of my invention is the fact that the pipes 7 are plain pieces of tubing, between which and the elbows a water-tight connection is formed by the use of expansion-joints—viz., nuts and packing-rings—the result being that any person can readily repair the heater so far as the water-pipes are concerned, and at the same time the pipes are individually free to move under expansion and contraction.

I claim as my invention—

1. In a water-heater, the combination of a casing, water-pipes arranged within the casing and connected together in pairs in vertical series by means of elbows and packing-rings and nuts providing packed expansion and contraction joints, said pipes being straight pieces of tubing, substantially as set forth.

2. In a water-heater, the combination of a casing, water-pipes arranged within the casing and connected together in pairs by means of elbows and packing-rings and nuts providing packed expansion and contraction joints, said pipes being straight pieces of tubing, substantially as set forth.

3. In a water-heater, the combination of a casing, water-pipes arranged within the casing and connected together in pairs by means of elbows and packing rings and nuts providing packed expansion and contraction joints, and means for holding said elbows from moving in a direction away from said pipes, substantially as set forth.

4. In a water-heater, the combination of a casing, water-pipes arranged within the casing and connected together in pairs by means of elbows and packing rings and nuts providing packed expansion and contraction joints, and rods passing through perforated ears on the elbows and through projections on the casing to hold said elbows from moving in a direction away from said pipes, substantially as set forth.

5. In a water-heater, the combination of a casing, water-pipes arranged within the casing and removably connected together in pairs in series with packed expansion and contraction joints, a supply-pipe, a distributing-pipe, a valve located between the supply-pipe and the lower one of the series of pipes, and a valve located between the distributing-pipe and the upper one of the series of pipes, substantially as set forth.

6. In a water-heater, the combination of a casing, a fire-box provided with a water-chamber with which a supply-pipe communicates, water-pipes arranged within the casing and removably connected together in pairs in series with packed expansion and contraction joints, a manifold with which the series of pipes connect, a valve located between the lowest pipe of the series and said water-chamber, and a valve located between the upper pipe of the series and said manifold, substantially as set forth.

7. In a water-heater, the combination of a casing, and water-pipes located within the casing and connected together in pairs; said pipes being plain pieces of tubing with which a water-tight expansion and contraction joint is made by the use of packing-rings and nuts, substantially as set forth.

8. In a water-heater, the combination of a casing, and water-pipes located within the casing and connected together in pairs by means of packed expansion and contraction joints through which the pipes move as they expand and contract, substantially as set forth.

9. In a water-heater the combination of a casing, and pipes arranged within the casing, and connected together in pairs by means of elbows joined to the pipes by means of expansion and contraction joints that come in direct contact with the pipes; substantially as described.

10. A water-heater comprising a casing, pipes arranged within the casing, elbows, and expansion and contraction joints which come in direct contact with the pipes and connect the elbows in pairs with the pipes; substantially as described.

CHAS. H. HARKINS.

In presence of—
W. R. RAYMOND,
C. A. GEERS.